US008328367B2

(12) United States Patent
Nemeth et al.

(10) Patent No.: US 8,328,367 B2
(45) Date of Patent: Dec. 11, 2012

(54) SYSTEM AND METHOD FOR PROJECTING ONTO AN UPPER SURFACE OF A BODY OF WATER (75) Inventors: Edward A. Nemeth, Hermosa Beach, CA (US); David W. Crawford, Long Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 33 days.

(21) Appl. No.: 13/102,701

(22) Filed: May 6, 2011

(65) Prior Publication Data

US 2012/0281152 A1 Nov. 8, 2012

(51) Int. Cl.
*G03B 21/22* (2006.01)
(52) U.S. Cl. ............... 353/71; 353/31; 353/72; 353/79; 353/119; 353/122; 359/443; 40/406; 40/407
(58) Field of Classification Search ............ 353/28, 353/31, 71, 72, 79, 119, 121, 122; 359/443–461; 349/5, 7, 8, 9; 239/11, 12, 16, 18, 20, 23, 239/518, 521, 523, 524, 590.5; 40/406–407
See application file for complete search history.

(56) References Cited

U.S. PATENT DOCUMENTS

| 3,334,816 | A |   | 8/1967  | Shuzo |   |
|-----------|---|---|---------|-------|---|
| 4,974,957 | A | * | 12/1990 | Kaelin ............................ | 353/10 |
| 5,353,074 | A | * | 10/1994 | Jones et al. .................. | 353/122 |
| 5,368,228 | A |   | 11/1994 | Adamson et al. | |
| 5,580,140 | A | * | 12/1996 | Katz et al. ........................ | 353/13 |
| 5,860,766 | A | * | 1/1999  | Lochtefeld et al. ............. | 405/79 |
| 6,669,346 | B2 | * | 12/2003 | Metcalf ........................... | 353/94 |
| 6,731,429 | B2 | * | 5/2004  | Lunde .......................... | 359/443 |
| 6,871,793 | B2 | * | 3/2005  | Rumens et al. .................. | 239/16 |

(Continued)

FOREIGN PATENT DOCUMENTS

JP           56165133         12/1981

(Continued)

OTHER PUBLICATIONS

Extended EP Search Report for Application No. 12166769.5-2216 mailed on Aug. 30, 2012.

*Primary Examiner* — Georgia Y Epps
*Assistant Examiner* — Sultan Chowdhury
(74) *Attorney, Agent, or Firm* — Marsh Fischmann & Breyfogle LLP; Kent A. Lembke (57) ABSTRACT

A projection system for projecting light such as images or content upon a liquid surface such as a lake or pool surface. The system includes an agitation assembly selectively operable to agitate a portion of the upper surface of liquid to form a projection screen. The system includes a projector assembly projecting or focusing light onto the projection screen on the upper surface of the liquid. The liquid is translucent to light, but the projection screen on the upper surface reflects a portion of the projected light due to the agitation. The agitation assembly may include an aeration system with a distribution manifold and is positioned below the liquid surface and has outlets discharging gas into the liquid such that air bubbles for the screen. The manifold outlets may be provided at two or more depths, whereby two or more portions of the projection screen are generated at differing times.

21 Claims, 7 Drawing Sheets

U.S. PATENT DOCUMENTS

| | | | |
|---|---|---|---|
| 7,740,359 B2* | 6/2010 | Schnuckle et al. | 353/79 |
| 7,922,103 B2* | 4/2011 | Houstoun | 239/20 |
| 2011/0013147 A1* | 1/2011 | Laduke | 353/28 |
| 2011/0285964 A1* | 11/2011 | Reichow | 353/10 |

FOREIGN PATENT DOCUMENTS

| | | |
|---|---|---|
| JP | 2005300561 A | 10/2005 |
| KR | 100943291 | 2/2010 |
| WO | WO03100520 A1 * | 12/2003 |

* cited by examiner

SYSTEM AND METHOD FOR PROJECTING ONTO AN UPPER SURFACE OF A BODY OF WATER

BACKGROUND

1. Field of the Description

The present description relates, in general, to visual display and projection systems, and, more particularly, to a method and system for projecting light, including still and video images, onto a body of water (or other liquid) such as in a pool or channel such that a display is provided on the upper or outer surface of the water, even though water is transparent or at least translucent to light.

2. Relevant Background

There is an ongoing demand for ways to create visually interesting and exciting displays that involve water. Throughout the world, fountains have been developed and installed that entertain spectators with jets and fans of water that have unique shapes. The fountains may even be operated in time with music and a light show to provide a unique, choreographed display. In some indoor displays, mist screens have been used to provide a curtain that can be used as a display surface using rear projection systems, and such display systems have been used regularly at large trade shows and other events to provide an interesting way to present information and to entertain a crowd.

In contrast, though, larger bodies of water present a more difficult challenge for the designer of a display. For example, a designer may wish to use a body of water in a pool or pond to display light or media (e.g., a video or still image from a projector) or may wish to display images in a channel of a water ride as a boat/vehicle carrying passengers travels through the water. The upper surfaces of these bodies of water are generally planar or smooth, and water is generally transparent or at least translucent to light. As a result, light projected onto the surface of these bodies of water is reflected well only at a specific, narrow angle with most of the incident light being transmitted rather than reflected, resulting in a large percentage of the incident light traveling through the water to the bottom of the pool or channel containing the water. At this point, the light may be reflected upward off the bottom to be viewed by spectators (e.g., people on or nearby the body of water).

A display on the bottom or sides of the pond/channel is generally not desirable as the projected content, such as still image or video, appears to be on the bottom of the pool/channel. This may make the image unclear or distorted as it has to be viewed through a depth of water which detracts from its clarity. Further, lighting the bottom of the pond/channel often will be undesirable as this may reveal equipment such as pumps and nozzles used to create a fountain or a track used to move a boat through an amusement park ride. Additionally, these lower surfaces under the water often are not useful for reflecting light in a predictable or desirable manner such as the bottom of a natural lake or river that may have a bottom covered with mud, rock, and plants. As a result, the surfaces of lakes, ponds, and rivers (all of which may be manmade such as a channel defining a river of water for an amusement park ride) have previously not been used as display surfaces for light-based shows or projected media.

SUMMARY

Briefly, the following description teaches systems and methods for projecting on surfaces of liquid such as upon the surface of a pond, a fountain, a river or water in a channel (such as an amusement park ride), or other body of water. The inventors recognized that although water is translucent or transparent to light that a projection surface or "screen" can be formed on an upper surface of a body of water by adequately agitating or disturbing the surface to create a diffuse reflecting surface. This agitated or roughened portion of the upper surface then will reflect a significant fraction of the projected light over a wide range of viewing angles to an observer rather than simply allowing the light to be transmitted to the bottom of the body of water.

In a tested embodiment, a projection system is provided that includes a projector assembly, such as a conventional video projector or lights useful for providing a light or laser show, and a surface agitation assembly in the form of an aeration system. The distribution or outlet manifold of the aeration system is positioned within the body of water at some depth (with deeper positioning generally providing a more uniform distribution of bubbles). A control or inlet valve is operated to feed pressurized air (such as at 5 to 40 psi or higher) to the distribution manifold, and the air is ejected from outlets, holes, pores, and/or nozzles of the manifold (or its disks, tubes, or the like). The ejected air rises in the form of numerous bubbles to the upper surface of the body of water, and these bubbles agitate the surface of the water and/or provide reflective spheres. As a result, a significant fraction of the light from the projectors that is focused on the projection surface/screen formed above the distribution manifold is reflected such that the projected content (such as still or video imagery) is visible by nearby spectators (e.g., passengers of a boat floating through or near the projection surface in the body of water or observers on the bank/shore).

More particularly, a projection system is provided for projecting or focusing light or images (content) upon an upper surface of liquid. The system includes an agitation assembly selectively operable to agitate a portion of the upper surface of liquid to form a projection screen. The system also includes a projector assembly projecting or focusing light onto the upper surface of the liquid. The liquid is at least translucent to light (e.g., is water or other translucent to transparent liquid), the projection screen on the upper surface reflects a portion of the projected light due to the agitation (whereas other non-agitated portions of the upper surface do not reflect a significant portion of the light).

In the system, the liquid may be water in an open container (a channel, pool, basin, or the like) and the upper surface is substantially planar. In some embodiments, the agitation assembly includes an aeration system with a distribution or outlet manifold with outlets discharging gas into the liquid. The manifold is positioned a depth below the upper surface of the liquid (e.g., 1 to 6 feet or more with 6 to 10 feet being useful in some cases).

The aeration system may include an inlet valve selectively operable (such as by a controller also operating the projection assembly) to provide pressurized gas to the manifold, whereby the projection screen is selectively generated and removed from the upper surface. The outlets of the manifold may be provided at two or more depths, whereby two or more portions of the projection screen are generated at differing times upon activation of the agitation assembly. In this regard, the manifold may be substantially planar (e.g., a plurality of side-by-side pipes or tubes) and is positioned within the liquid to be transverse to the upper surface such that a first end of the manifold is at a first depth and a second end of the manifold is at a second depth greater than the first depth.

The aeration system is fluidically connected to an air supply providing air at a pressure such as of at least 5 psi or at least 30 psi (to provide a high quality and more "dense"

distribution of bubbles). In the system, the projector assembly may include a projector projecting a still or video image upon the projection assembly. In some cases, the system may include a vehicle floating on the upper surface of the liquid and the vehicle may float through the projection surface/ screen. In some embodiments, the agitation assembly is mounted on the vehicle such that the projection surface/ screen can be generated anywhere the vehicle is located in the body of water.

DETAILED DESCRIPTION

Briefly, the present description is directed toward methods and systems for projecting light such as a laser show or images (video or still) from a projector upon a liquid surface for viewing by viewers or spectators. The liquid surface may be a relatively planar surface of a body of water, either still or flowing, in a basin, pool, channel, or other open liquid container, and the liquid may be water or some other transparent (or at least translucent) liquid. A projection surface or screen is created in a portion of this liquid surface that effectively reflects a significant portion of light from a projection device(s) to allow a viewer to see the images as reflected light. To this end, a surface agitation mechanism such as an aeration system may be used to generate the projection surface within or as part of the liquid surface (e.g., numerous air bubbles act to reflect the projected light to a viewer). Numerous special effects may be created by controlling the operation of the surface agitation mechanism, e.g., the amount or rate of agitation to create a sharper image or a hazier image, turning the mechanism on and off quickly or slowly to present/remove an image rapidly or with a fade in/out effect, and so on.

Figure 1:
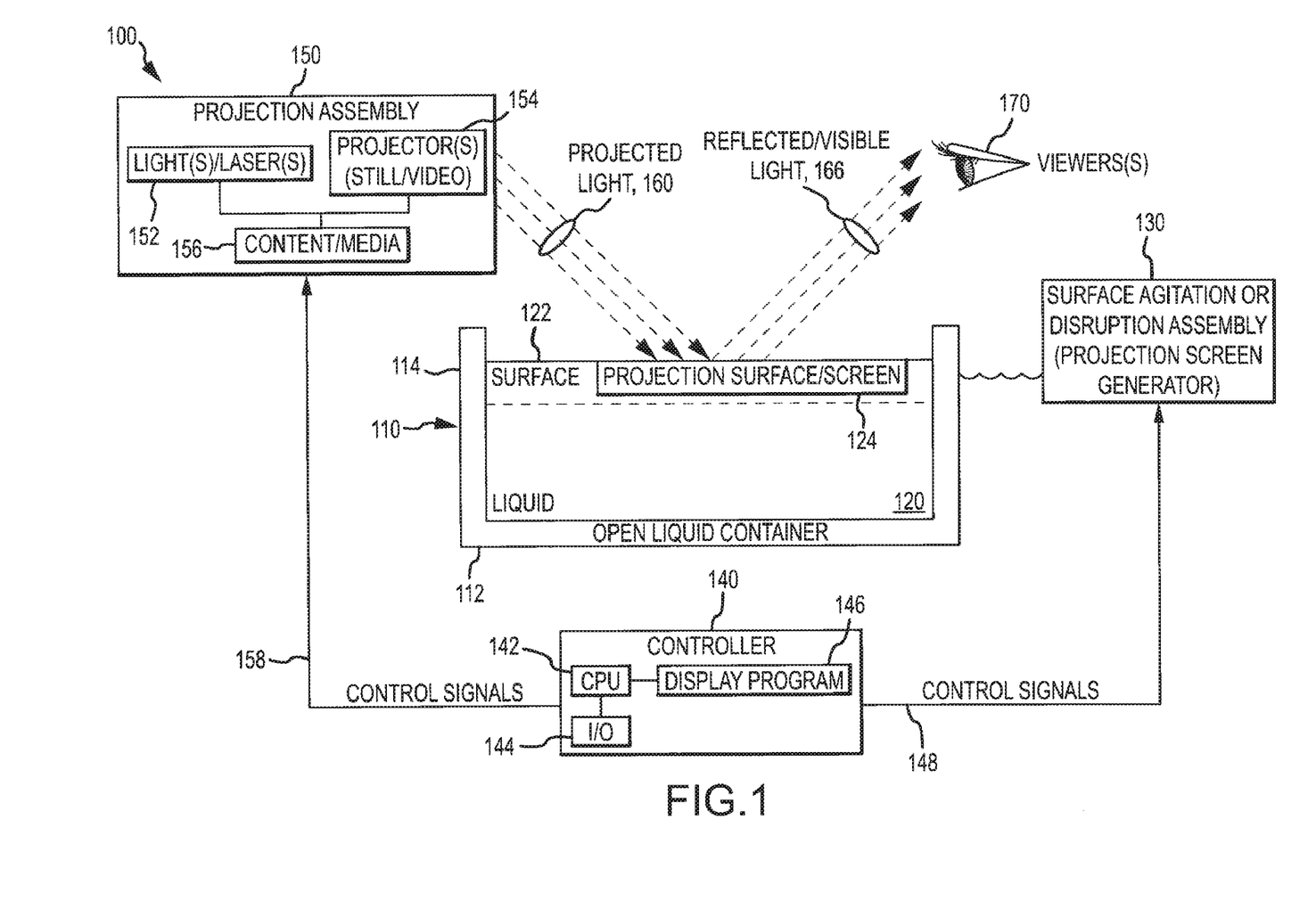
FIG. 1 is a functional block or schematic diagram of liquid surface projection system of an embodiment of the invention.

FIG. 1 illustrates in functional block (or schematic) form a liquid surface projection system 100 that can be used to display images 166 to a viewer 170 using a surface 122 of liquid 120. The liquid 120 is a translucent to transparent liquid such as water that typically has a planar or still surface 122 that is not useful (without the system 100) for projecting light as it allows a large percentage of any received light 160 to pass through it. For example, the projection system 100 includes an open liquid container 110 such as a basin or pool or a channel (e.g., for a water ride). The liquid container 110 is open in that it includes a bottom 112 and a sidewall(s) 114 extending up from the bottom to receive and retain a volume of liquid 120 but the liquid 120 is exposed via the opening in the sidewall 114. Specifically, an upper surface 122 of the liquid 120 is open to the surrounding environment or air. The upper surface 122 typically is still or substantially planar (with some small amount of waves in some outdoor settings or in a water ride or similar setting in which a wake may be created by a boat).

During operation of the system 100, a projection surface or screen 124 is formed on this otherwise smooth or planar surface of the liquid 120. To this end, a surface agitation (or disruption) assembly 130 is provided in the liquid surface projection system 100. The assembly or projection screen generator 130 functions to form an area of the surface 122 that is useful for reflecting received light 160 to a viewer 170 as shown at 166 while adjacent portions of the surface 122 allow the light 160 to travel through the liquid 120 (e.g., to strike the bottom 112 or sides 114).

In one embodiment, the surface agitation assembly 130 includes one, two, or more wave generators that may be useful for creating rows or a cross-hatch pattern of standing waves (or the like) or a surface roughness in projection surface 124 that reflects the received, projected light 160 to an adequate level to create a useful amount of visible light 166 viewable by a viewer. In other embodiments, the surface agitation assembly 130 includes one or more aeration systems positioned within the container 110 in the liquid 120 but a distance (e.g., 1 to 5 feet or more) below the surface 122. When the assembly 130 is then operated, numerous gas bubbles flow to the surface 122 at the location (and in the shape/size) of the projection surface/screen 124 to form the surface/screen 124.

Numerous embodiments of an aeration system or device may be used to practice the system 100, and a relatively low inlet gas pressure (such as low as about 5 pounds per square inch (psi) may be useful in some cases whereas higher pressures (up to 30 to 40 psi or more) may be preferable in other settings) may be utilized to form the screen 124 by causing numerous gas bubbles to flow through the surface 122. Likewise, the aeration tubing (or nozzles) may have many arrangements to provide a desired distribution of the gas bubbles (e.g., a simple soaker hose, a tube with small holes, an arrangement with numerous fountain-like nozzles, an aeration stone like those found in fish tanks, and many other arrangements may be used) and the density of such an aeration "manifold" may also be varied (e.g., distance between gas feed/distribution lines and their arrangement in the container 110 may be selected to provide a desired density of bubbles on the surface 122 in the projection screen 124). In other words, the term distribution or aeration manifold is intended to be construed broadly and may include nearly any structure useful for generating air bubbles such as a disk diffuser, a tube diffuser, a blower, or other devices often used in conventional aeration systems (such as pond/lake aeration systems, water treatment facilities, and the like).

The projection system 100 further may include a controller 140 such as a computer-based or similar electronic device that is useful for sending control signals 148 to selectively operate the surface agitation assembly 130. The controller 140 may include a processor 142 that manages operations of input and output (I/O) devices 144 such as a monitor, a touch screen, a keyboard, a mouse, and the like that allow an operator to view operational information and to initiate operations of the projection system 100. The processor 142 may have memory and run one or more display programs 146 that act to generate the control signals 148. For example, a show or display may be defined by the display program 146 that calls for selectively and periodically operating the agitation assembly 130 to form the projection surface/screen 124 (e.g., only generate screen 124 when projected light 160 is provided and/or fade in and/or out the display of light 160 by turning the agitation assembly on and off in a rapid or gradual manner such as to provide varying amounts/sizes of spherical lenses (gas bubbles) or wave peaks/intersections).

The projection system 100 further includes a projection assembly 150 that is operable by the controller 140 (e.g., based on running the display program 146 and/or based on manual inputs/selections by an operator via I/O devices 144) transmitting control signals 158 (which may, in some cases, include the content/media 156). The projection assembly 150 functions to project light 160 onto the projection surface 124, and the surface 124 reflects a portion of the light 160 as reflected/visible light 166 to a viewer 170. The projection assembly 150 may include one or more lights and/or lasers 152 to provide a light/laser show with light 160 (e.g., synchronized or random light designs or patterns provided on screen 124). The projection assembly 150 may also or instead include one or more projectors 154 that are used to provide the projected light 160, which may include still or video content/media 156. For example, a still image of a character may be provided on an amusement park ride, a marketing message may be presented in a mall water feature, a video or animated image may be provided in a pool or basin, and so on.

The inventors recognized that it is not possible to get a diffuse reflection off a relatively smooth surface of water because water is transparent or at least translucent to light. Despite this hurdle, the inventors were attempting to provide a system that had the ability to project directly on water that would facilitate incredible new shows, special effects, and interactive/gaming opportunities for designers of water rides, water-based attractions, and creative entertainment/marketing structures using a pool/volume of water. The inventors discovered that aeration of a water surface creates enough surface disruption such that the disrupted area or portion of the water surface can be used as a projection surface. Specifically, the results of a scaled mock up were successful at demonstrating that colors, graphics, images (still and video), and text are readily discernable and readable on the projection surface formed within the water surface.

Generally, the inventors have created a water surface projection system. One embodiment includes a pneumatic aeration system positioned underwater (beneath the surface of a body of water in an open container such as a basin or channel). The aeration system is selectively operable by a controller to provide a plurality of small gas bubbles (e.g., a uniform distribution of small air bubbles) over a desired projection area on the water surface. The water surface projection system also includes a projection or lighting system directing a stream of projected light (with content in the form of colors, shapes, images, videos, and so on), and the projected light may be focused on the water surface in the created projection surface/screen.

In the projection system, the pneumatic plumbing and control system may be configured to allow an operator (or controller running a display program) to, over a time period during a show/display, vary the air pressure and/or flow rate from zero to a maximum design pressure (e.g., from 0 to 40 psi or higher). The aeration system may be mounted statically in the water way or in the water container. In other embodiments, the aeration system may be positionable by a control system to move the projection surface (or change its shape and size) while in other cases the aeration system may be attached to a boat, vehicle, or object that can move about the water basin or container so as to reposition the projection surface on the water surface.

The aeration system may include a source of pressurized air/gas and a porous material or tubing/manifold with numerous small outlets, and the air from the source is forced through the porous material or outlets of the manifold and gas bubbles float to the water surface. The aeration system may also include a constricted nozzle to output the pressurized air to disrupt the water surface. The aeration system may be mounted such that its outlet tubing or manifold (which may include porous material) is mounted in a flat or horizontal plane position (e.g., majority of gas outlets are in a plane such that the bubbles are discharged at a like or similar depth in the water). In other embodiments, though, the outlet tubing/manifold is mounted at an angle such that the gas outlets are at differing depths so as to "activate" or create (and remove) the projection screen at differing times or in a directional manner when the system is turned on and off (e.g., a left side of the screen may be formed first by bubbles discharged at a first, shallower depth and a right side of the screen may be formed last by bubbles discharged at a second, deeper depth (and when the system is turned off the left side would disappear first, too)).

Many configurations of the water surface projection system may be useful to practice the present invention, and one system 100 is shown in FIG. 1 with other figures illustrating in more detail particular useful embodiments. The aeration system may take many forms to provide a projection screen by disrupting the surface of the liquid, e.g., configured to create a volume of small, uniformly distributed bubbles over the desired projection area. The aeration system may be mounted anywhere under the water surface even on a moving boat or to be pivotable/positionable so as to move the projection surface through the water. Interesting effects can be achieved as the aeration system starts up, shuts down, or is "pulsed" (e.g., bursts of bubbles separated by no bubbles) to effectively turn the projection surface on and off. This has the effect of revealing and dissolving the projected image/light in very interesting and organic ways and can be used (such as by operation of the controller) to create a unique and infinitely varying projection surface.

Testing of water surface projection systems using a scaled mock up has proven that the projection surface is useful and works for a wide variety of lighting (background or environmental lighting as well as projected lighting) and imagery. The testing has indicated that several techniques and/or design considerations may be implemented to hide the nature of the effect and prevent observers from identifying the surface bubbles and/or their source (e.g., how the projection surface is generated in the projection system). For example, smaller diameter bubbles may be useful in providing higher image resolution (e.g., it may be useful to use smaller outlets/holes in the outlet manifold of the aeration system). However, excellent results were obtained when a video was projected onto a projection screen formed by pushing air through a standard garden soaker hose (e.g., a tube/pipe with numerous perforations or holes in its sidewall).

Additionally, it may be the case that placing the aeration system's outlet manifold deeper provides a higher quality and more uniform projection surface. In other words, nearly any depth may be useful but a deeper placement (such as 4 to 8 feet or more) may be more forgiving while a shallower placement may be improved by providing a tighter or higher density grid/array of the manifold tubing/piping/porous material (e.g., denser arrangement of gas outlets when shallow placement is used). Further, high contrast imagery may work better for the projection content (e.g., high contrast imagery on a black background). For example, bright text or lines on a black background have been shown to be very easy to read when projected on a projection surface of the present invention. Typically, the overall light saturation or intensity is kept as low as possible. In some cases, moving objects or imagery may provide a more desirable image on the liquid projection surfaces when compared with a stationary or still image since the image moves through areas of local disruption caused by upwelling water moved to the surface by the rising bubbles.

Figure 2:
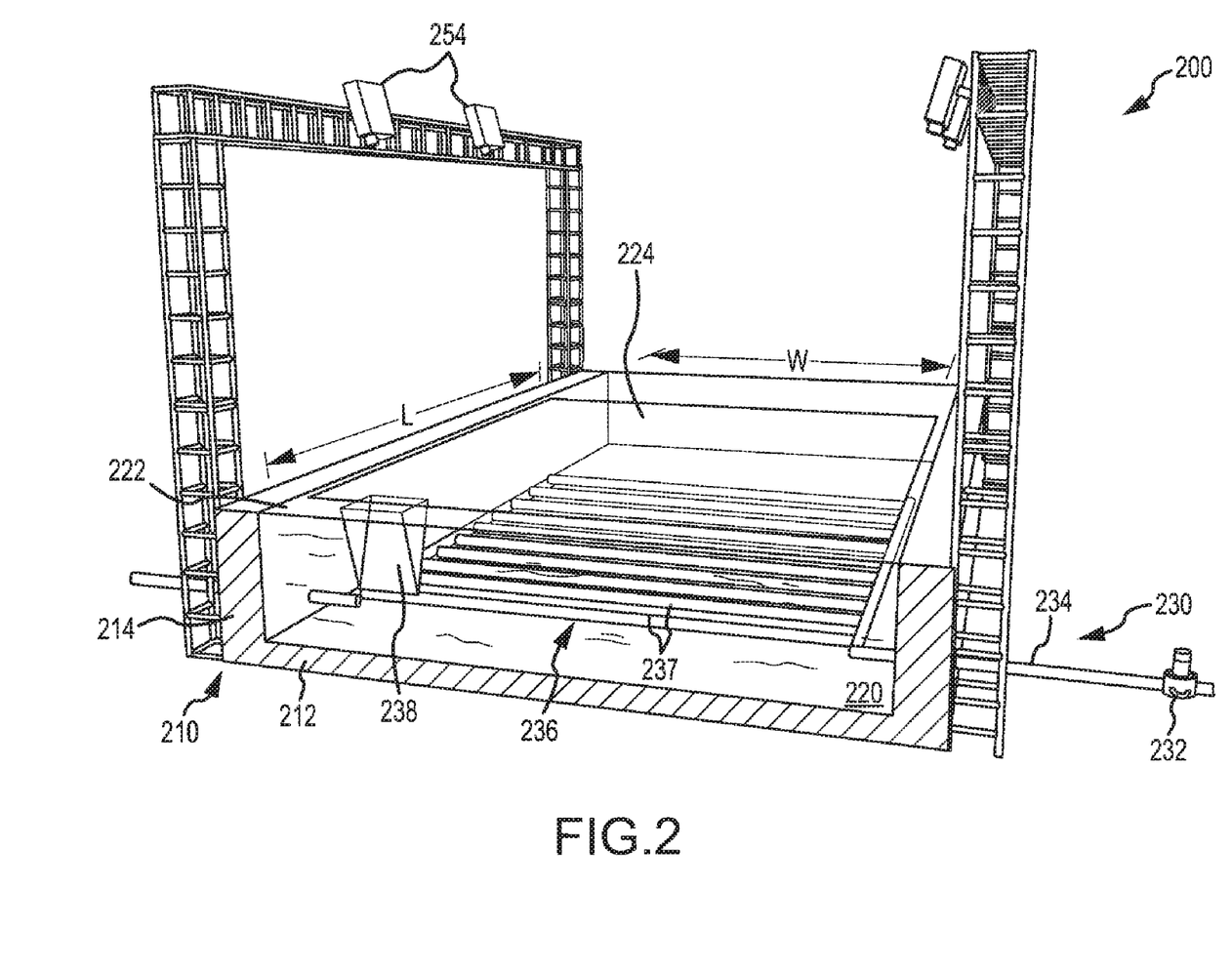
FIG. 2 is a perspective, cross sectional view of a projection system that may be used to generate and projection upon a projection screen on a water surface.

FIG. 2 illustrates a perspective, sectional view of a water surface projection system 200 of an embodiment of the invention. As shown, the system 200 includes a basin or pool (e.g., an open water container) 210 that includes a base or bottom wall 212 and vertical sidewalls 214 extending upward a distance defining a depth of the pool (or channel such as may be used for a water ride) 210. The pool 210 is filled with a volume of a translucent to transparent liquid 220 such as water to about the depth of the pool 210. The liquid 220 has an upper surface 222 exposed within the system 200, and the surface 222 may be generally planar or smooth, e.g., such that light projected onto surface 222 generally will pass through the liquid 220 to strike the bottom wall 212 and then be reflected.

However, the system 200 is shown during operation to generate or provide a projection surface 224 on an area of the surface 222. Light (such as a still or video image or moving light patterns) is projected upon the surface 224 with projectors/lights 254, and the projection surface 224 has features such as a roughness in the form of spherical bubbles that cause the light (or at least a substantial percentage such as up to 40 to 60 percent or more) to be reflected. The projector 254 may be fed content by a media server (not shown) that may provide images, video, textures, and so on to the projectors 254 in a wired or wireless manner to selectively display content (or projected light with content) on the projection surface 224.

The projection surface 224 has a shape and size that is defined by the mechanism used to disturb or agitate the surface 222, and, as shown, the projection surface 224 is rectangular in shape with a width, W, and a length, L, both of which will typically be less than the width and length of the pool but may be about equal to the entire available surface 222. Relatively large surfaces/screens 224 can easily be provided similar to those used for projection screens in movie theaters or even larger while some embodiments may provide much smaller surfaces such as a surface 224 the size of a television screen or smaller.

To generate the projection surface 224, the projection system 200 includes an aeration system 230. Generally, the aeration system 230 may be nearly any device that is adapted to put air or other gases into the water 220 such as aeration units, air stones, nozzles, permeable membranes, and so on connected to a pressurized air supply or source. The aeration system 230 performs to create small bubbles 238 from pressurized air. FIG. 2 shows only a portion of the bubbles 238 used to form the projection surface 224 (as most are removed for ease of showing the aeration system 230 components but would extend throughout the water 220 below the surface 224). Typically, the aeration system 230 is configured to provide relatively small bubbles and to evenly distribute them to provide a relatively high quality and uniform surface 224 (e.g., bubbles that are 0.25 inches or less in diameter when they reach the surface 222 with a density that is consistent across the surface 224 (unless it is desired to provide a surface 224 with void areas or non-reflecting/lower reflection portions)). In some cases, the smaller and more evenly distributed the bubbles 238 are the better the resolution of the image (e.g., like numerous pixels or spherical mirrored surfaces reflecting the light to an observer).

As shown, the aeration assembly 230 includes an inlet valve 232 that is selectively opened/closed (and, in some cases, throttled) to control flow of air from a pressurized air supply (not shown) into an inlet or feed line 234. The inlet line (or regulated air inlet) 234 supplies pressurized air at a particular flow rate and pressure to a distribution manifold (or array) 236. The distribution or outlet manifold 236 is positioned within the pool or container 210 such as near the bottom 212 or at some other depth. The manifold 236 is shown to be formed, in this example, of a plurality of linear tubes or pipes 237 arranged in a spaced apart but side-by-side manner (e.g., tubes or pipes 4 to 12 inches apart or the like), and the tubes 237 extend across a portion of the bottom 212 (e.g., nearly the entire distance between sidewalls 214).

Again, the spacing between adjacent tubes/pipes 237 may be increased with increasing depth to obtain a similar uniformity in the bubbles 238, but a denser spacing of tubes 237 typically will provide a higher surface uniformity at a particular air pressure. In the illustrated example, the tubes/pipes 237 of the manifold 236 are arranged in a horizontal plane such that bubbles 238 from any tube 237 reached the surface 222 in about the same amount of time. The size and shape of the manifold 236 is substantially matching that of the surface 224 (but, typically, somewhat smaller than the surface 224). The pressure used may vary, and the inventors have tested pressures of 30 to 40 psi, but lower (or differing) quality but useful surfaces 224 may be achievable at much lower pressures such as down to about 5 psi and at higher pressures. The system 200 provides a relatively simple to design and operate water projection system. It has the added advantage that the projectors do not have to be placed in the water 220 as was the case of some displays that placed display devices a depth below the water and tried to project out from a planar surface 222.

Figure 3:
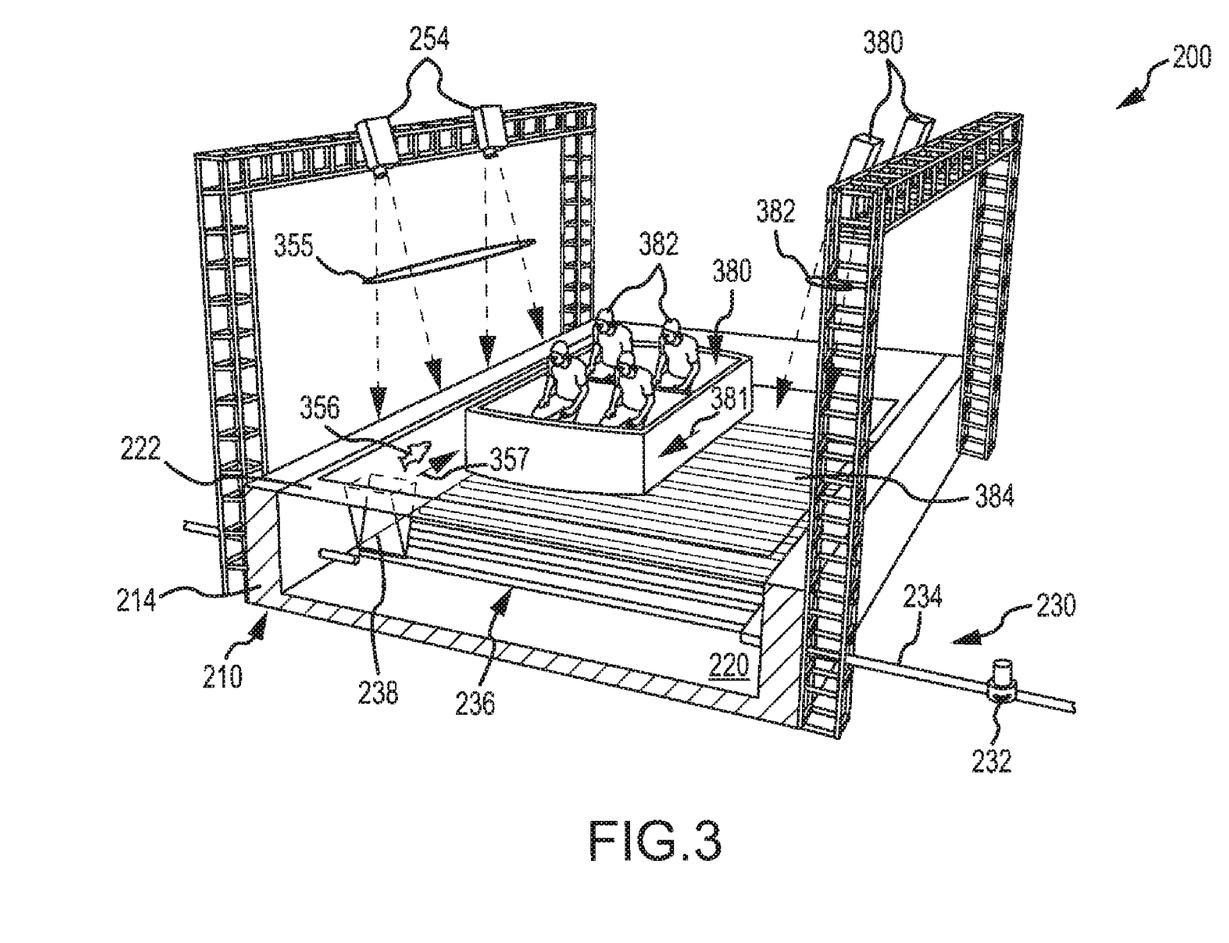
FIG. 3 illustrates the projection system of FIG. 2 during operation to project images on the projection screen adjacent a passing vehicle (e.g., a passenger boat)

FIG. 3 illustrates the projection system 200 during its use to project upon the projection surface 224. As discussed, the underwater grid/manifold 236 provides an aeration array in the water 220. Air moves through the aeration grid/manifold 236 and the tubes/pipes with their outlets/holes convert the pressurized air into small bubbles 238 that may be uniformly distributed across the projection area 224. The bubbles 238 move primarily vertically to the surface 222 and due to location of the manifold's outlet tubes/pipes in a horizontal plane the surface 224 is created and terminated as a unit (or though out the area of the surface 224 concurrently).

The projection system 200 is shown to be provided as part of a water ride as may be useful for an amusement park. In this application, a vehicle in the form of a passenger boat 380 is shown to seat several observers or passengers 382, and the boat 380 is shown to be traveling or floating though the projection surface 224. A first pair of projectors 254 are used to project an image or light 355 upon the projection surface 224 to provide an object or character (such as a fish/shark) 356 that may move 357 about the boat 380 as it changes locations on the projection surface 224 (or as the boat 380 moves 381 through the surface 224).

A second pair of projectors 380 is used to project a video or light 382 that provides an animated or moving image or design 384 on the projection surface 224 near the boat 380 so as to be visible from the boat 380 by the passengers 382. The moving image or design 384, for example, may simply be enhanced bubbles (e.g., lighted or colored forms of the bubbles 238) or may take many other forms such as to cause the water surface 222 to appear to be flowing lava. In this manner, a projection screen 224 can be selectively created (e.g., appear as a boat 380 approaches), and the projection screen 224 does not interfere with movement of the boat 380. The images 356 and 384 may enhance the ride such as by interacting with the passengers 382 or changing the "feel" of the ride such as by causing the passengers 382 to believe the boat 380 is moving much faster in the water 220 by moving the projected imagery in an opposite direction than the boat 380 (e.g., relative speed of the boat 380 will seem to increase).

Figure 4:
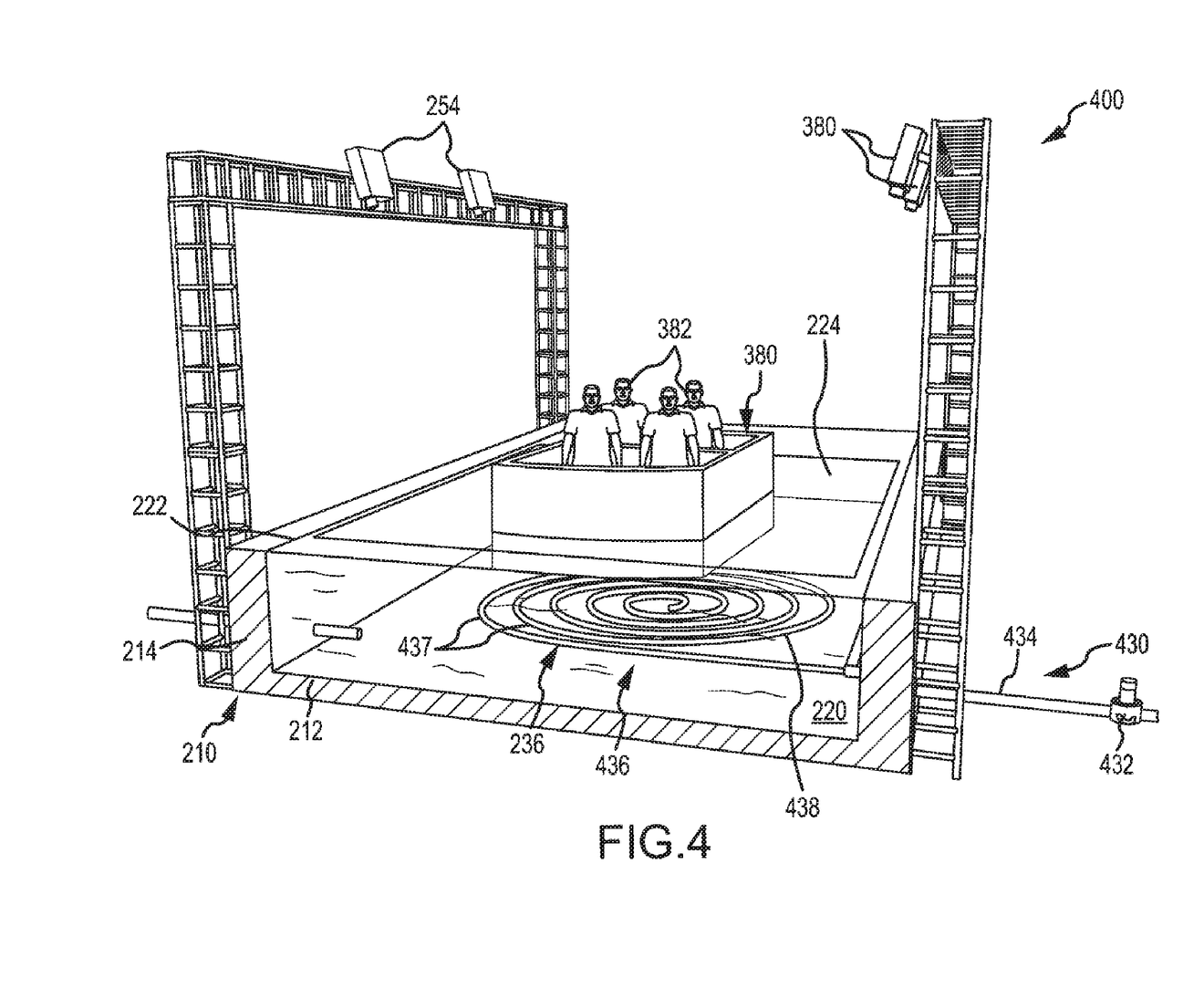
FIG. 4 illustrates a projection system similar to that shown in FIG. 3 but with an alternative aeration system providing a differing projection surface/screen on the upper surface of the body of water.

FIG. 4 illustrates another embodiment of a water surface projection system 400 similar to that shown in FIG. 3. The system 400 includes a number of the same components as system 200 of FIG. 3, and these components are given like numbers and not described further. The projection system 400 includes an aeration system 430 that has an inlet/control valve 432 and an inlet/feed line 434 providing a flow of pressurized air.

The system 400 differs from system 200 in its configuration of the distribution manifold or array 436. The manifold 436 includes a tubing/pipe 437 with outlets/holes/pores/nozzles that release the pressurized air to form bubbles 438 in the water 220. However, the tubing 437 is arranged to provide a number of space-apart, concentric circular patterns. In this manner, the tubing 437 provides bubbles 438 that rise to the surface 222 of the water 220 and form a generally circular-shaped projection surface/screen 424 above the manifold 436. The system 400 is useful for showing that the manifold 436 (or 236) shape and size generally defines the shape and size of the projection surface 424 (or 224), and nearly any size and shape projection surface may be formed upon a surface of a body of water. Such shapes may also be combined by providing two or more surfaces that overlap or that are spaced apart (e.g., the surfaces 224 and 424 could be combined to provide a rectangular screen with a semi-circular end or the like).

Since the bubbles used to form the projection screens move primarily vertically toward the surface, a horizontal manifold provides a projection screen that is turned on and off (e.g., the vertically rising bubbles all reach the surface at about the same time across the area of the projection surface). The inventors recognized that by tilting the distribution manifold, a projection surface can be activated in a controlled direction or over time from end-to-end to create "wipe on" and "wipe off" transition effects.

Figure 5:
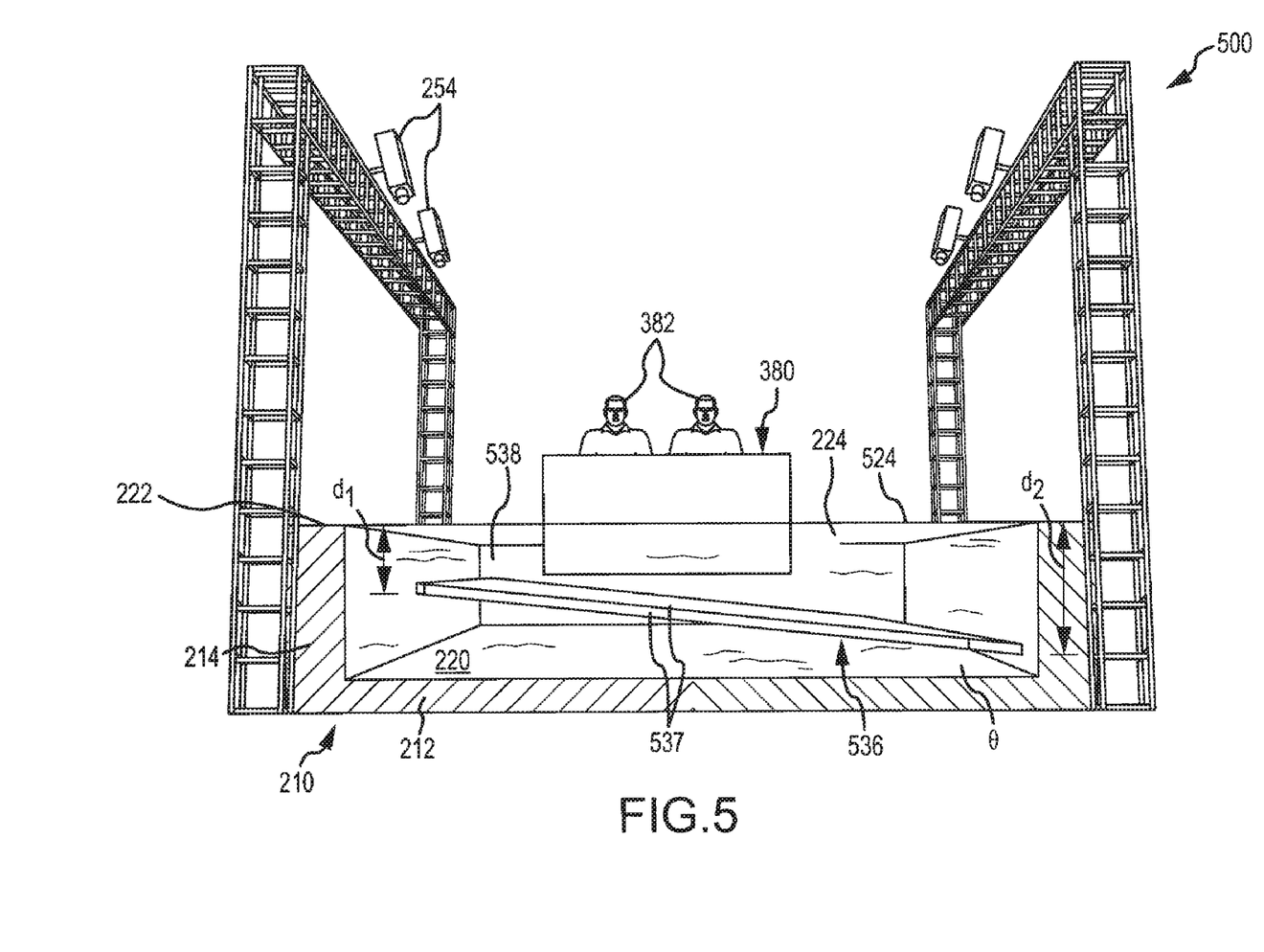
FIG. 5 illustrates a liquid surface projection system similar to those shown in FIGS. 3 and 4 that includes an angled or sloped distribution manifold to provide a projection surface that is formed and removed over a time period (rather than on/off)

To this end, FIG. 5 illustrates a liquid surface projection system 500, similar to systems 200 and 400, that includes a sloped distribution manifold 536. The manifold 536 may take a configuration similar to that of manifold 236 with a plurality of spaced-apart, linear tubes/pipes 537 with outlets/pores to produce bubbles 538 when air is fed into the manifold 536. The rising bubbles 538 foam a projection screen/surface 524 on the water surface 222 of body 220.

The manifold 536 is sloped or angled (i.e., at an angle, $\theta$, relative to horizontal or, in this case, the bottom 212), and the angle, $\theta$, causes one end of the manifold 536 to be at a first depth, $d_1$, and a second end of the manifold 536 to be at a second depth, $d_2$, that is greater than the first depth, $d_1$. In this way, the bubbles at the first end reach the surface more quickly such that the projection surface 524 above this first end of the manifold 536 is created first when the bubbles 538 are output from the manifold 536 and is also removed or destroyed first.

In this way, the projection surface 524 is provided in a wipe on manner (and an image projected on the surface 524 may also be wiped on) and in a wipe off manner (and an image projected on the surface 524 may also be wiped off or faded out in a directional manner over time). The slope or angle, $\theta$, may be varied to create a desired effect, but some embodiments use an angle, $\theta$, in the range of 15 to 60 degrees with 30 to 45 preferred in some cases. In other embodiments, the differing depths may be provided in two or more sections without use of a sloped manifold, such as with raised or lowered portions (tubes/pipes) to create desirable effects with a varying projection surface/screen 524.

Figure 6:
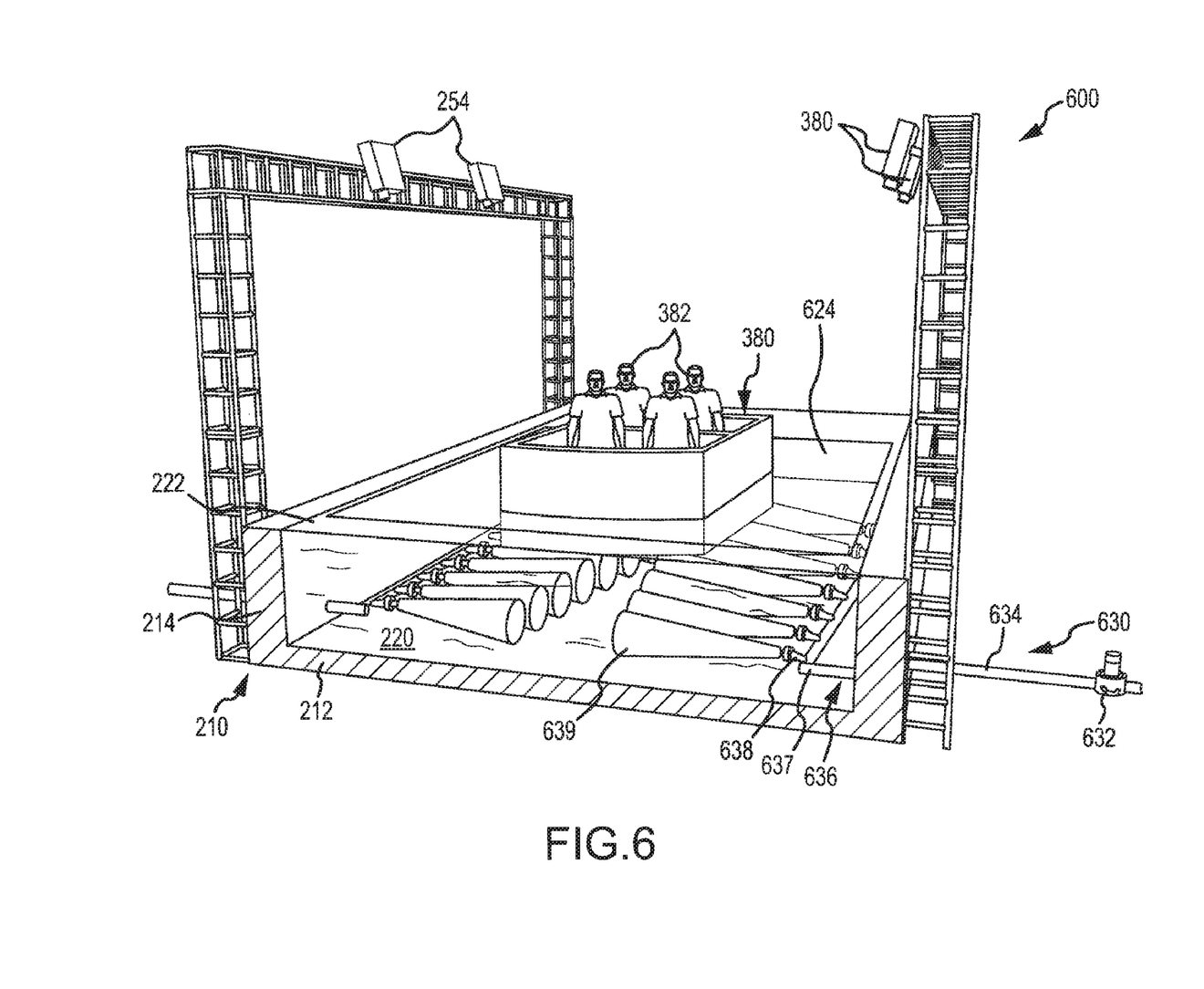
FIG. 6 illustrates a liquid surface projection system similar to that shown in FIG. 3 that includes a nozzle-based distribution manifold in the aeration system.

FIG. 6 illustrates another embodiment of a water surface projection system 600 similar to that shown in FIG. 3. The system 600 includes a number of the same components as system 200 of FIG. 3, and these components are given like numbers and not described further. The projection system 600 includes an aeration system 630 that has an inlet/control valve 632 and an inlet/feed line 634 providing a flow of pressurized air.

The system 600 differs from system 200 in its configuration of the distribution manifold or array 636. The manifold 636 includes a pair of manifold headers 637 that extend the length of the manifold 636 and are rigidly mounted at a depth in the water 220 such as on the inner surfaces of sidewalls 214. The bubbles 639 are output from these headers 637 via a number of nozzles 638 fed pressurized air by the headers 637. This embodiment 600 may be thought of as the "under water nozzle array," and air is forced at high pressure through aeration nozzles 638 so bubbles 639 move horizontally as they rise to the surface 222 to create the projection screen 624.

The resulting projection screen 624 may be less uniform than those provided by other described aeration systems, but the projection screen 624 may be useful for providing a projection surface extending away from the edges of the body of water and is especially useful for creating a projection surface in a body of water that is very deep or difficult to mount equipment to the bottom. In other embodiments, the width of the channel or body of water 220 and/or pressure of the air (and/or design of the nozzles 638) is selected to have the bubbles 639 from the nozzles 638 on each sidewall 214 to overlap at the center of the channel/body of water 220 to provide a contiguous screen/surface 624.

In some cases, it may be desirable to provide a projection screen that is present or available wherever a boat or other floating structure is located in a body of water (e.g., can be generated adjacent to or proximate to the boat). For example, it may be useful to be able to project on water proximate to a boat as it travels along a ride path or across a body of water. To this end, the projection assembly may be fixed in particular locations or be provided on the moving boat or floating structure and the surface agitation mechanism(s) are provided on the boat (or towed behind/pushed in front of the boat).

Figure 7:
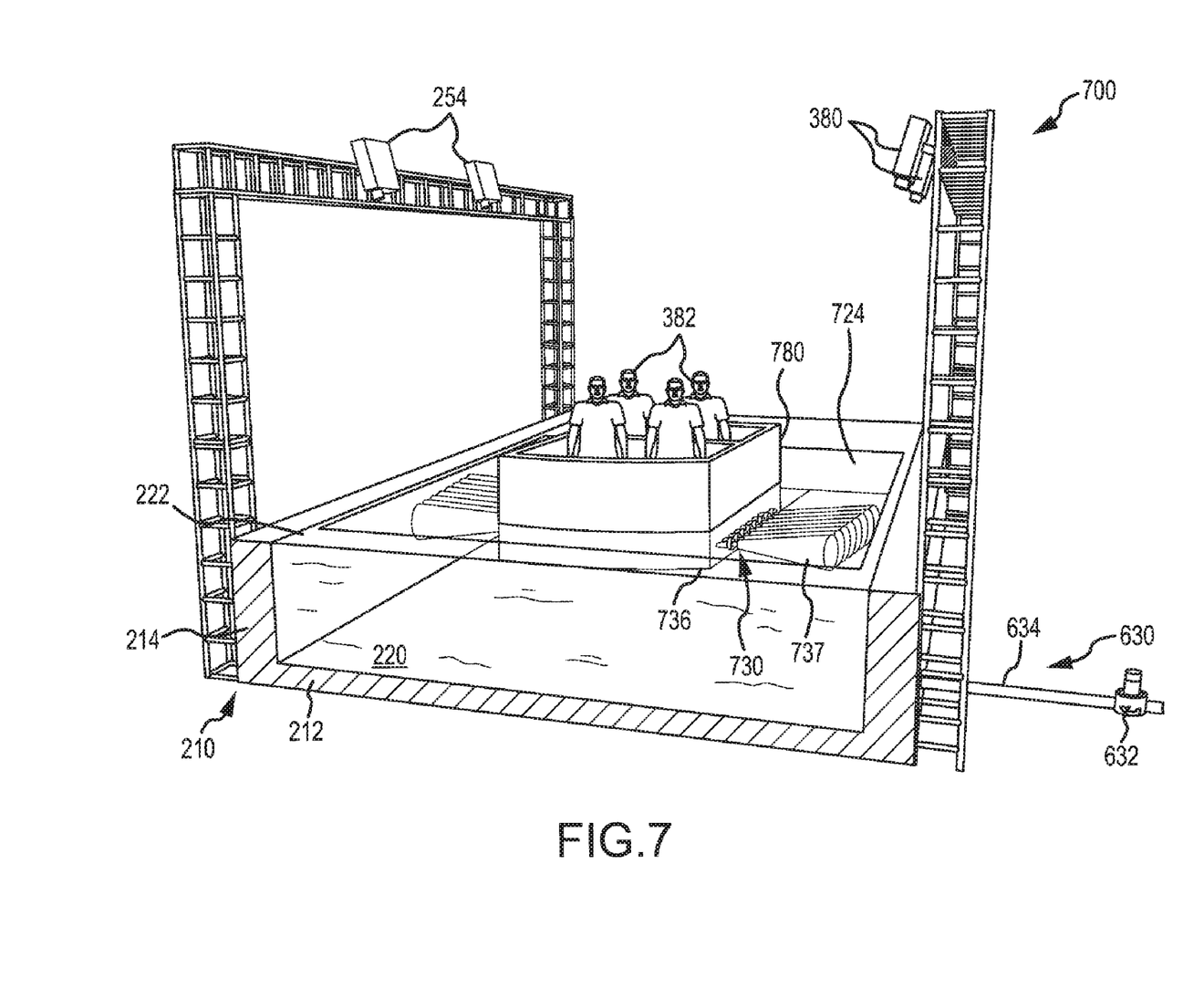
FIG. 7 illustrates another projection system similar to that shown in FIG. 6 that provides the aeration system on the passenger vehicle/boat.

For example, FIG. 7 illustrates a liquid surface projection system 700 similar to that of FIG. 3. In this case, though, the aeration assembly/system 730 is provided within the boat 780. The aeration system 730 would include a pressurized air source (not shown) and manifold 736 with outlets on the hull of the boat 780 to discharge pressurized air to form jets of bubbles 737 that float to the surface 222 to form a projection surface 724 in the body of water 220. The projectors 254, 380 can then be selectively operated to project images/light upon the surface 724 and display images/lights adjacent the boat 780, which may be moved about the surface 222 in the body of water 220.

The aeration system 730 may be operated in a manner that is synchronized to the location and operation of projectors 254, 380 such as by creating bubbles 737 and surface 724 only when the boat 780 is in an area of water 220 that is a focus point/location for the projectors 254, 380. In this manner, a movable or portable projection screen can be provided for use with nearly any body of water (e.g., useful on lakes, rivers, and even the ocean (such as by cruise ships or the like)). In some embodiments, the air nozzles/manifold 736 on the boat 780 may be controlled by the passengers 382 with a user input device in/on the boat 780. The passenger 382 may then selectively create the projection surface 724, which would cause projected content to be displayed (e.g., to "paint the water surface" near the boat with colored light, to reveal objects such as sunken treasure, fish, swimming or displayed characters/information, and so on).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The projection systems and methods may have a number of commercial applications such as in residential or public swimming pools, in public or residential fountains, and so on. The projected content is useful for pure entertainment but it may also be used to provide advertising/marketing content (such as in the fountain of a mall). The air flow in the aeration systems may be kept constant (e.g., a relatively stable air pressure during operations) or the air flow may be varied to fade the projection screen density in and out (provide fewer or more bubbles over time to vary the display surface and create a hazier or clearer image over time). The projector may be moved (or more than one projector used) such that the displayed images move about the projection surface, which may be useful to for projection surfaces that have "dead spots" where bubbles are not as prevalent.

The projection methods and systems described herein provide a number of advantages and have unique aspects and/or features not available in other projection techniques. The generated projection surface is permeable such that objects, vehicles, and people may move through it. The projection systems allow display designers to create unique and infinitely variable projection surfaces (e.g., due to the variability of the surface the image appears to change over time and will vary each time it is projected and experienced by a viewer). The projection system allows shows or displays to be provided in areas and locations that typically could not be utilized (e.g., within the reach of individuals in a vehicle or within the vehicle's envelope as the vehicle may float over a projection surface/screen while it is in use to display a projected image).

The projection systems can be used to change a vehicle passenger's perception of vehicle speed by projecting a water/ground surface motion. A vehicle will be perceived as being stopped, moving more quickly forward, or even moving backward by causing images to move past the vehicle (or to move with the vehicle) at relative speeds. The projection screen allows numerous images or items to be projected upon a liquid's surface such as obstacles for a vehicle, characters, graphics, text, a whirlpool or rapids for a raft/boat ride, and so on. The fluid's make up may even appear to be changed by the projected images such as from water to fluid lava, clouds, mercury, and other flowing materials. The projection surfaces may be used to cause objects or characters to appear to be under the surface of the body of the water. The projection systems can be used to provide dramatic space transformations (e.g., a vehicle may be transported from a lagoon filled with water to outer space by projecting a star field or "land" onto the water).

The projected content may be selected to create a desired effect or display. The content may be readily changed to provide seasonal overlays. In other cases, the projection surface location and content could be chosen to show graphical waypoints in front of a boat or an actual path of a boat on the water surface. A branching path or false path could be shown indicating a wrong or off-path way the boat may go (e.g., into a dangerous obstacle or attaching character/animal). In one proposed embodiment, a boat is moving across a large lagoon or body of water with a large projected surface such that the boat appears to sail through a desired environment (such as a garden or desert) or through a projected maze (e.g., with a track indicating the correct path to follow).

The projection surface with or without projected content/images can be utilized to hide underwater equipment such as that used to move a boat through the water. The water surfaces texture or make up can be changed, e.g., from water to a dissolving surface, to a solid deck/ground, to ice, and so on. The content can even make the depth of the water appear to change or vary about the boat.

The projection system may be operated in an interactive manner. For example, the passengers may use user input devices on the boat or sticks, paddles, and so on to touch the water surface in the projection surface (with such movements being tracked) to caused a reaction or change in the projected content such as to create objects (e.g., paint a lily pad on the water surface), to scare objects away or move projected objects. In other embodiments, the boat may include squirt guns to allow passengers to squirt targets in/on the water (e.g., in the projected image/content on the projection surface) or the boat may include nozzles on the front of the boat to act as an ice breaker/melting device such that the boat can push bubbles forming the projection surface and projected images out of the way.

The projected content can provide "reflections" or displays of many difficult to build or otherwise simulate objects or creatures such that the objects/creatures appear to be over the heads of the passengers and the boat. The content may simulate special effects such as enhancing an explosion, fire, and the like on the water surface. The content may vary widely to practice the invention such as to include text, directions, clues, gaming instructions, point totals for a boat during a game, and the like. The projected imagery may also provide bioluminescence effects, glowing trails, streaks, wakes, paths, light cycles/boats, and so on.

We claim:

1. A projection system for projecting upon an upper surface of liquid, comprising:
   an agitation assembly selectively operable to agitate a portion of the upper surface of liquid to form a projection screen; and
   a projector assembly projecting light onto the projection screen on the upper surface of the liquid, wherein the liquid is at least translucent to light and wherein the projection screen on the upper surface reflects a portion of the projected light,
   wherein the agitation assembly comprises an aeration system including a manifold with outlets discharging gas into the liquid,
   wherein the manifold is positioned a depth below the upper surface of the liquid,
   wherein liquid is contained in an open container that includes a first sidewall and a second sidewall, and
   wherein the distribution manifold includes a first header with gas outlets mounted on the first sidewall and a second header with gas outlets mounted on the second sidewall, whereby a projection screen with one or two spaced apart surfaces is formed in an upper surface of the volume of the liquid received in the open container via rising gas bubbles.

2. The system of claim 1, wherein the liquid is water in an open container and wherein the upper surface is substantially planar.

3. The system of claim 1, wherein the aeration system includes an inlet valve selectively operable to provide pressurized gas to the manifold, whereby the projection screen is selectively generated and removed from the upper surface.

4. The system of claim 1, wherein the outlets of the manifold are provided at two or more depths, whereby two or more portions of the projection screen are generated at differing times upon activation of the agitation assembly.

5. The system of claim 4, wherein the manifold is substantially planar and is positioned within the liquid to be transverse to the upper surface, whereby a first end of the manifold is at a first depth and a second end of the manifold is at a second depth greater than the first depth.

6. The system of claim 1, wherein the aeration system is fluidically connected to an air supply providing air at a pressure of at least 30 psi.

7. The system of claim 1, wherein the projector assembly comprises a projector projecting a still or video image upon the projection assembly.

8. The system of claim 1, further comprising a vehicle floating on the upper surface of the liquid, wherein the agitation assembly is mounted on the vehicle.

9. A display system, comprising:
an open container for receiving a volume of a liquid;
an aeration system including a distribution manifold positioned within the open container and a gas supply for selectively providing pressurized gas to the distribution manifold; and
a projection assembly focusing light into the open container at a location above the distribution manifold,
wherein the open container includes a first sidewall and a second sidewall and wherein the distribution manifold includes a first header with gas outlets mounted on the first sidewall and a second header with gas outlets mounted on the second sidewall, whereby a projection screen with one or two spaced apart surfaces is formed in an upper surface of the volume of the liquid received in the open container via rising gas bubbles.

10. The display system of claim 9, wherein, when the volume of the liquid is received in the open container is received in the open container, the distribution manifold is positioned a depth below an upper surface of the liquid.

11. The display system of claim 10, wherein the liquid is at least translucent to light and wherein a projection screen reflecting the focused light is formed in the upper surface above the distribution manifold when the pressurized gas is provided to the distribution manifold.

12. The display system of claim 10, wherein the distribution manifold is positioned in the open container to be sloped such that outlets in the distribution manifold are at a plurality of depths.

13. A method of projecting on a translucent surface of a body of water, comprising:
positioning an outlet manifold of an aeration system in the body of water at a depth below the surface;
operating a control valve of the aeration system to feed pressurized gas to the outlet manifold, wherein a plurality of bubbles rise to a portion of the surface of the body of water;
projecting light upon the portion of the surface of the body of water, whereby the light is reflected to an observer; and
moving a passenger boat through the portion of the surface of the body of water during the projecting of the light,
wherein the outlet manifold is mounted on the passenger boat and
wherein the operating of the control valve is performed in response to operation of a user input device by a passenger of the passenger boat.

14. The method of claim 13, wherein the projected light includes a video image.

15. The method of claim 13, wherein the operating of the control valve includes varying a volume of the pressurized gas fed to the outlet manifold over a period of time, whereby an amount of the bubbles provided to the portion is varied over the time period.

16. The method of claim 13, wherein the projecting of the light includes moving one or more images to differing locations within the portion of the surface of the body of water.

17. A method of projecting on a translucent surface of a body of water, comprising:
positioning an outlet manifold of an aeration system in the body of water at a depth below the surface;
operating a control valve of the aeration system to feed pressurized gas to the outlet manifold, wherein a plurality of bubbles rise to a portion of the surface of the body of water; and
projecting light upon the portion of the surface of the body of water, whereby the light is reflected to an observer,
wherein the operating of the control valve includes varying a volume of the pressurized gas fed to the outlet manifold over a period of time, whereby an amount of the bubbles provided to the portion is varied over the time period.

18. The method of claim 17, wherein the projected light includes a video image.

19. The method of claim 17, wherein the projecting of the light includes moving one or more images to differing locations within the portion of the surface of the body of water.

20. A method of projecting on a translucent surface of a body of water, comprising:
positioning an outlet manifold of an aeration system in the body of water at a depth below the surface;
operating a control valve of the aeration system to feed pressurized gas to the outlet manifold, wherein a plurality of bubbles rise to a portion of the surface of the body of water; and
projecting light upon the portion of the surface of the body of water, whereby the light is reflected to an observer,
wherein the projecting of the light includes moving one or more images to differing locations within the portion of the surface of the body of water.

21. The method of claim 20, wherein the projected light includes a video image.

* * * * *